United States Patent
Lock et al.

(10) Patent No.: US 8,073,434 B2
(45) Date of Patent: Dec. 6, 2011

(54) SYSTEM AND METHOD OF OBJECT SIMULATION IN AN INTERMITTENTLY CONNECTED MOBILE APPLICATION

(75) Inventors: Hendrik Lock, Linkenheim (DE); Janusz Smilek, St. Wendel (DE); Bernard Schletz, Bad Rappenau (DE); Jutta Netzel, Dieburg (DE); Ramprasadh Kothandaraman, Bangalore (IN)

(73) Assignee: SAP AG, Walldorf (DE)

( * ) Notice: Subject to any disclaimer, the term of this patent is extended or adjusted under 35 U.S.C. 154(b) by 1013 days.

(21) Appl. No.: 11/857,196

(22) Filed: Sep. 18, 2007

(65) Prior Publication Data
US 2009/0075643 A1 Mar. 19, 2009

(51) Int. Cl.
*G06Q 10/00* (2006.01)
(52) U.S. Cl. .......... 455/414.1; 455/422.1; 701/1
(58) Field of Classification Search ........ 455/422.1, 455/414.1; 705/1
See application file for complete search history.

(56) References Cited

U.S. PATENT DOCUMENTS

| | | | |
|---|---|---|---|
| 6,389,423 B1 * | 5/2002 | Sakakura | 707/613 |
| 6,810,405 B1 * | 10/2004 | LaRue et al. | 707/613 |
| 7,437,405 B1 * | 10/2008 | Theis et al. | 709/203 |
| 2002/0161769 A1 * | 10/2002 | Sutinen et al. | 707/10 |
| 2004/0224674 A1 * | 11/2004 | O'Farrell et al. | 455/418 |

* cited by examiner

Primary Examiner — Charles Appiah
Assistant Examiner — William F Rideout
(74) Attorney, Agent, or Firm — Kenyon & Kenyon LLP

(57) ABSTRACT

The generation and comparison of a first time stamp and a second time stamp allows for the active operation of a mobile device that is intermittently connected to a middleware system. A document is created with a first stamp, where this document relates to a particular activity associated with one or more objects. Affected object fields are also created to include a second time stamp. The first time stamp is updated to reflect a data request object and the second time stamp reflects when the affected object is adjusted on the back-end system. Until the second time stamp is later in time than the first time stamp, indicating successful processing of the data request object, the mobile device simulates the successful processing of the data request object to reflect the adjustment in a data object value.

17 Claims, 3 Drawing Sheets

| 1 | GENERATE LOCAL DOCUMENT, SET FIRST TIME STAMP |
| 2 | PROCESS MESSAGE AND EXTRACT DATA OBJECT |
| 3a | SET NEW TIME FOR FIRST TIME STAMP |
| 3b | GENERATE BACK-END DOCUMENT |
| 3c | COMPARE TIME STAMPS |
| 4 | EXECUTE BACK-END DOCUMENT, INCLUDING MODIFYING DATA OBJECT |
| 5 | COMPARE TIME STAMPS |

SYSTEM AND METHOD OF OBJECT SIMULATION IN AN INTERMITTENTLY CONNECTED MOBILE APPLICATION

COPYRIGHT

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

The present invention relates generally to processing operations in a mobile device that it is intermittently connected to a business logic service system, i.e., back-end system, and more specifically to a mobile device with intermittent communication simulating data field values for the execution of local processing applications until confirmation of a back-end processing operation.

In mobile processing environments, remote or handheld devices include significant amounts of local processing power to conduct and facilitate various commercial transactions. By way of example, an order handling system may allow a salesperson to place an order on a handheld device using local processing applications. This remote device may or may not be in wireless communication with the back-end processing system.

In these systems, the veracity of the data can be vital. For example, if a person places an order for a particular item, it can be extremely important to know or validate the inventory level or even possibly the naming of the item to insure the accuracy of the original agreement as well as the smooth transaction of any subsequent commercial transaction, including the proper delivery of the requested goods.

The mobile device may not be in communication with the back-end processing system for any number of a variety of reasons. For example, the mobile device may not recognize a wireless signal or may disable the wireless communication to save power. In these existing systems, it is also common to utilize a middleware component to facilitate the interaction of the remote device to the back-end system. As recognized by one skilled in the art, the middleware provides the intermediary, where the mobile device communicates with the middleware component and the middleware component thereupon communicates with the back-end processing device.

As a local document is created on the mobile device, the local object data should accurately reflect the back-end system object data. A document may be one or more of a variety of different types of electronic documents, such as for example an order form where the mobile device relates to procuring sales. In another example, the document may be a reporting document or other type of electronic document reflecting various types of data objects, such as an inventory amount or outstanding ordering amounts for a business transaction. It is recognized that many other varieties of electronic documents may be created on this mobile device, where the mobile device not only displays data object values, but also allows a user to change or suggest modification to these values.

By the mobile device being in intermittent communication with the back-end system, problems can arise regarding correct data object values. An adjustment on the local device is not authorized until verified on the back-end system, but it can be important to accurately reflect these adjusted values on the mobile device. Problems arise in the management of the data itself and these systems include a master back-end system with final authorization and control over the data on the handheld device. As these systems typically include a central back-end system and numerous mobile devices, the central system owns the data that is replicated or made available on the mobile device.

Typically, the mobile device, upon making the data object value adjustment, queues up a data message with the change request (for example an order form with a request for X number of items and thereby reducing an inventory value by a corresponding amount). Upon a first communication, the mobile device sends the message to the back-end system.

As the mobile device does not maintain an active on-going communication and the back-end system does not necessarily immediately process the change request, the mobile device operates for a period of time having incorrect data object information. The mobile device may receive confirmation of the successful processing of the change request upon a later synchronization with the middleware system, but for the intermittent period of time, the data object values are improper. Having the improper information on the mobile device, even for a short period of time, can be problematic as the user continues to use the mobile device and must rely on the accuracy of the information when generating documents or otherwise processing or performing various operations on the mobile device. Therefore, there is a need for a technique for maintaining the accuracy of the object data on the mobile device operating in conjunction with the asynchronous communication technique.

DETAILED DESCRIPTION

Performing a simulation of a data object value allows an intermittently connected mobile device to provide the user a visual display of a data field that represents a potentially adjusted but not yet confirmed value. The mobile device and the back-end system operate by coordinating time stamp information. The mobile device generates a document including a first time stamp and the back-end system generates a modified data object that includes a second time stamp. The modified data object is synchronized with the mobile device such that when the modified data object is updated, the second time stamp is also updated. Upon re-connection with a middleware system connected to the back-end system, the time stamps are updated. The mobile device compares the times stamps and based on this comparison, determines if the simulation should be executed, when viewing the data object having a change pending.

Figure 1:
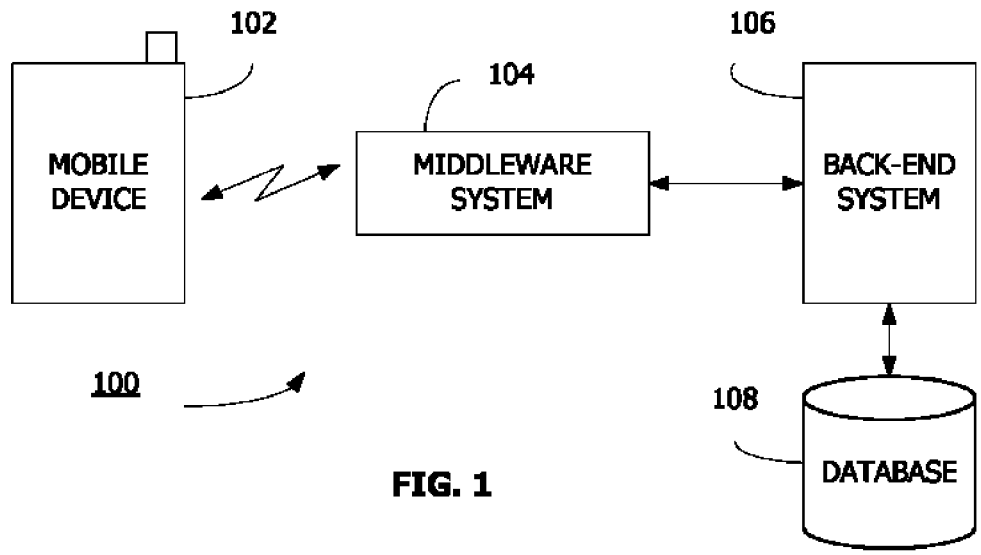
FIG. 1 illustrates one embodiment of a system with intermittent communication between a remote device and a back-end system, including error handling.

FIG. 1 illustrates a system 100 that allows for utilizing adjusted data on an intermittently connected mobile device. The system 100 includes a mobile device 102, a middleware processing system 104, a back-end system 106 and a database 108. As described in further detail with respect to FIG. 2, the mobile device 102 may be any suitable mobile device including processing capabilities for running local programs or applications and communicating user-input information to the middleware system 104. The middleware processing system 104 may be one or more processing devices executing software processing instructions for performing middleware operations, including facilitating communication between the mobile device 102 and the back-end system 106.

The back-end system 106 may be one or more processing devices or systems executing a back-end processing application, such as an enterprise application for example. The database 108 may be any suitable storage device or devices accessible by the back-end system for managing data objects relating to the underlying back-end processing application executed by the system 106.

It is recognized that for the sake of brevity, numerous elements have been omitted from FIG. 1. For example, the mobile device 102 may wirelessly communicate with the middleware system 104 and the middleware system 104 also directly communicates with the back-end system, whereby various communication-related elements have been omitted as recognized by one having ordinary skill in the art.

Figure 2:
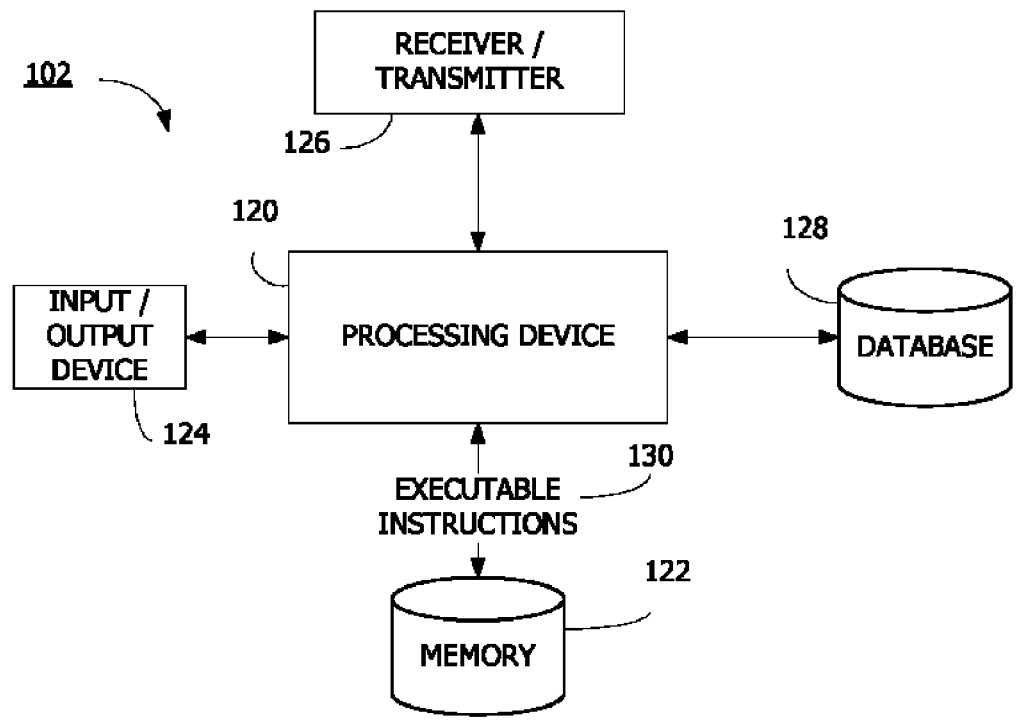
FIG. 2 illustrates another embodiment of a system with intermittent communication between a mobile device and a back-end system.

FIG. 2 illustrates a more detailed embodiment of the mobile device 102 of FIG. 1. The mobile device 102 includes a processing device 120, a memory device 122, an input/output device 124, a receiver/transmitter 126 and a storage database 128. The processing device 120 may be one or more processing elements operative to perform processing operations in response to executable instructions 130 received from the memory 122. The input/output device 124 may be any suitable device or devices allowing for user input and subsequent user output, for example a keypad and a screen or a touch-screen. The receiver/transmitter may be one or more components allowing for communication between the mobile device 102 and the middleware system (104 of FIG. 1), such as using a wired or wireless transmission technique. The database 128 may be a local data storage device operative to store object data as used by the processing device 120 in executing the local applications in response to the executable instructions 130.

Referring back to FIG. 1, the mobile device 102 is in intermittent communication with the middleware system 104. The intermittent communication may be from the mobile device user and the mobile device 102 being outside of a communication zone, the communication being inactive to conserve battery power, among other scenarios. As connectivity should not restrict the user from using the mobile device 102, the user may enter information on the mobile device, such as through the input/output device 124 of FIG.

In an exemplary embodiment, the user may enter product information in an ordering scenario. For example, a buyer may request to purchase a requested number of items, the seller using the mobile device 102 may locally enter the order information on the mobile device, such as using the input device 124. Through a local processing application on the processing device 120, this order information is received, processed and stored in the database 128. When the receiver/transmitter 126 is in communication with the middleware system 104, the new or updated information may be transmitted thereto. Although, until the active communication is established, the mobile device 102 allows the user to continue to engage in the business-related activities.

Figure 3:
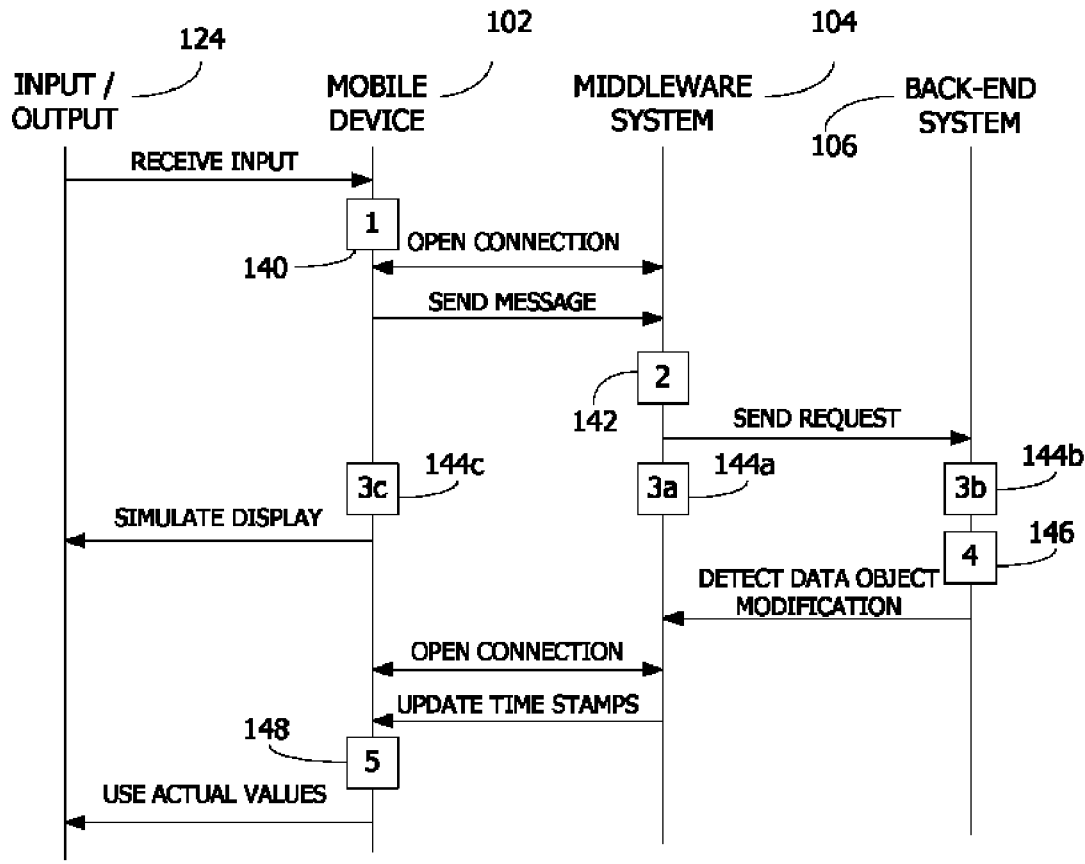
FIG. 3 illustrates a data flow diagram of one embodiment of a technique for utilizing adjusted data on an intermittently connected mobile device.

In one embodiment, the operations of the system 100 and the mobile device 102 are described with respect to the data flow diagram of FIG. 3. The mobile device 102, and more specifically the processing device 120, receives an input command from the input device 124. This input command is a data request object to update a data field on a local document. The data request object may include an instruction as well as an indicator to a particular object that is to be adjusted. An example of a local document may be an ordering form where a user wishes to order X number of a particular item. Operating functional operation 1, 140, the mobile device 102 generates a local document with the updated information and sets a first time stamp. The setting of the first time stamp may include resetting any existing value or simply setting the time stamp to a base initial value, such as using the maximum time value as an initial value.

When the mobile device 102 and the middleware system 104 are in open communication with a wireless connection, the mobile device 102 transmits the message to the middleware system 104. In one embodiment, the mobile device 102 may queue the data message with the updated value of the data field as requested by the user until the connection is active and communication allowed.

The middleware system 104, operating in accordance with known middleware operating techniques, processes the message and extracts the data request object, as illustrated by box 2, 142. The data request object extracted from the message is then sent to the back-end system 106.

In the data flow diagram of FIG. 3, steps 3a, 3b and 3c (144a, 144b and 144c respectively), are illustrated as occurring about the same time. It is recognized that these steps do not have to occur simultaneously, but are illustrated at the same point in the flow timeline for convenience purposes only. On the middleware system 104, a new time stamp for the first time stamp is set when the back-end system receives or begins processing the data request object. On the back-end system 106, the system processing the data request object, step 144b, where this document recreates the document on the mobile device including the replicated data request object to change a data value from an original value to an updated value. The back-end system 106 then owns and manages this document.

On the mobile device 102, the processing device 120 compares the first time stamp as known on the mobile device with a second time stamp. The second time stamp is generated by the back-end system 106 when the back-end system begins the process for modifying the data object. The mobile device mirrors the back-end system and allows for the setting of this second time stamp to be adjusted by the connection with the middleware system. Thus, when the data object is modified, either the middleware system 104 or the back-end system 106 adjusts the second time stamp and provides this adjusted time stamp to the mobile device 102 when actively connected.

If the back-end system 106 has not yet executed the action of the data request object or has executed the action but not yet relayed the information confirming update to the mobile device 102, the mobile device 102 does not know if the data object value has been properly modified. This lack of confirmation about the status of the back-end system operations and the value of the data object is reflected by the second time stamp known on the mobile device 102.

Therefore at step 3c, 144c, the mobile device 102 compares the time stamps. In this case, the first time stamp would be later in time than the second time stamp because the either the mobile device has not yet received confirmation of the change of the data object or the back-end system has not yet processed the data request object. As the comparison indicates the first time stamp is later in time than the second time stamp, the mobile device provides a simulated display to the output device 124. This simulated display includes referencing the data request object and simulating that the data request object has been processed. Although, as this data has not officially been changed on the mobile device, the mobile device maintains the original value, such as for example in case the data request object is not approved by the back-end system.

By way of the previously discussed example, suppose the user places an order for X number of a particular item. A simulation of an inventory view may include providing a display of the original inventory amount with the X value subtracted therefrom. The user is presented with a simulated display of a prospective active value, but the mobile device maintains proper accounting or storage information.

At another point in time, the back-end system 106 performs the step of executing the back-end process, which includes modifying the data object, 146. In the above example of a sales order, this may include processing a sales order and updating an inventory amount by the sample value X to reflect an adjustment of the number of items now available in the inventory. The middleware system 104 thereupon receives notification or may otherwise detect data object modification. The back-end system 106 may provide an object modification command to the middleware system 104 or the middleware system 104 may actively monitor the back-end system 106 activities to determine when changes are performed. This change in activity includes a change or update in the second time stamp that is associated with the modified data object.

Due to the intermittent communication between the mobile device 102 and the middleware system 104, the middleware system 104 may temporarily store the updated second time stamp until the connection is established. Eventually, the mobile device 102 synchronizes with the middleware system 104 allowing for the transmission of data therebetween. The middleware system 104 updates the time stamps that it currently has. The second time stamp is updated based on the change in data object value. Additionally, the first time stamp may be updated if the mobile device has not been in communication with the middleware system when the back-end process was initially started.

In the mobile device 102, the processing device once again compares the time stamps, step 148, before processing an operation. By way of example, a user may again be checking to see an inventory level of selected items. With the previous connection, the mobile device received updated data object values or in another embodiment may have received confirmation of proposed data object values, where the confirmation is that the back-end system has accepted proposed data object changes in the original document.

In this operation, as the second time stamp reflects that the data object has been modified on the back-end and this occurs later in time than the first time stamp, a comparison of the time stamps reveals that the second time stamp is greater than or later in time than the first time stamp. Based on this comparison, the processing device may thereupon avoid using the simulation routine for the data values, but rather can simply rely on the actual values in an output.

Figure 4:
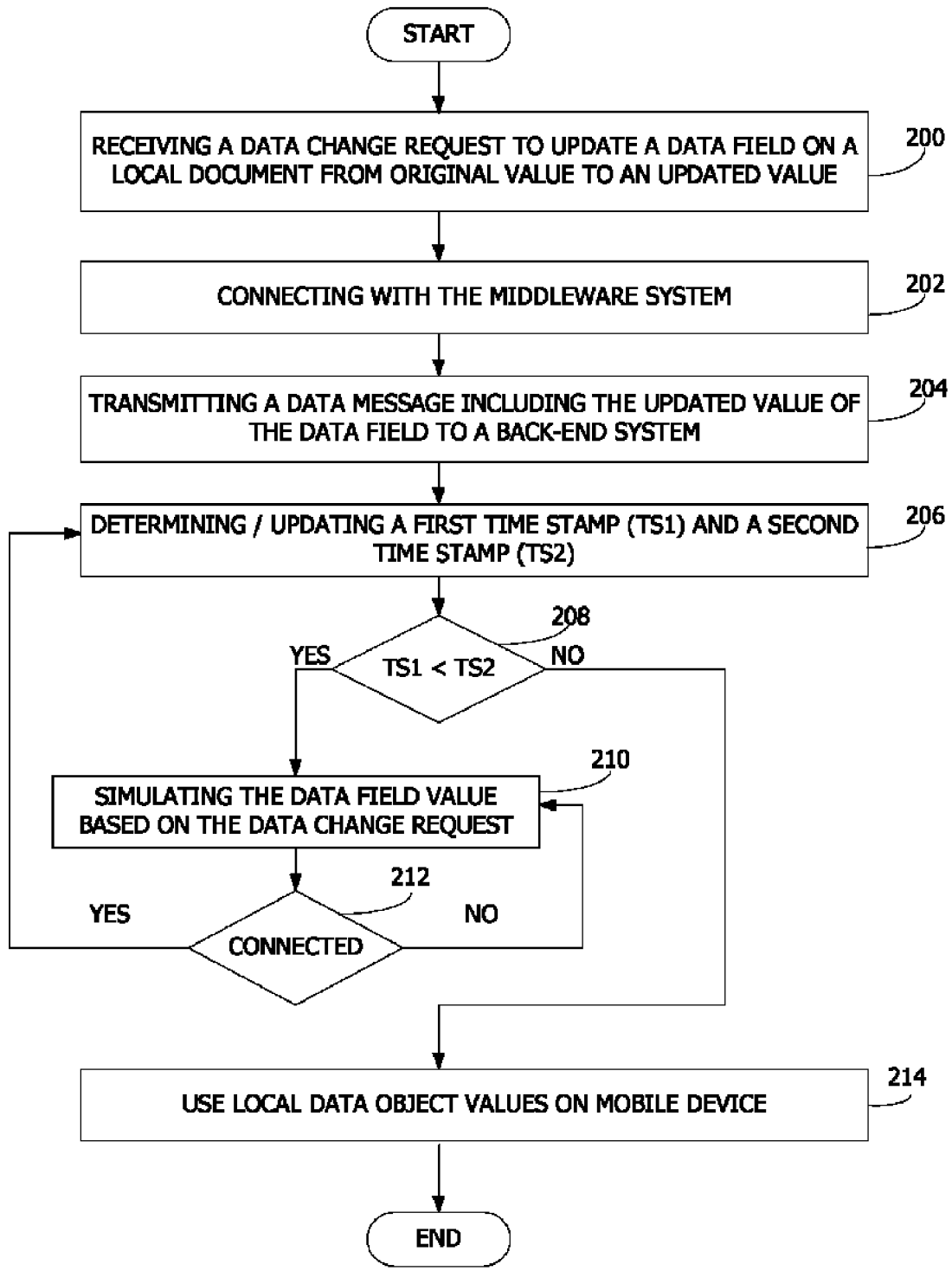
FIG. 4 illustrates a flowchart of the steps of one embodiment of a method for utilizing adjusted data on an intermittently connected mobile device.

FIG. 4 illustrates a flowchart of the steps of one embodiment of a method for utilizing adjusted data on an intermittently connected mobile device. The method begins, step 200, by receiving a user request to modify a data object and creating a data request object to update a data field on a local document from an original value to an updated value. The data request object may reference the data object to be modified, or affected object, without directly changing the value. In the above-listed example, user input may be an order request for ordering a number of one or more items. Due the intermittent nature of the mobile device, the next step in this embodiment, step 202, is connecting with the middleware system. A period of time may expire between when the data request object is received in step 200 and the mobile device synchronizes with the middleware system as this is typically dependent upon the mobile device being within a wireless communication range or enabling wired or wireless connectivity. Between steps 200 and 202, the user may continue to use the mobile device in normal operations where one or more data messages can be queued up in the mobile device until connection to the middleware system is completed.

The next step, step 204, is transmitting a data message including the data request object to a back-end system. This step may include transmitting one or more messages in the event more than one message is queued up awaiting transmission. The middleware system operates in accordance with known middleware processing techniques and processes the messages, including extracting the data request object for the back-end system.

The next step, step 206, is determining or updating a first time stamp (TS1) and a second time stamp (TS2) on the mobile device. The first time stamp (TS1) is associated with the data request object and its value is the time of creation or processing of this request on the backend. The second time stamp (TS2) is associated with the modified object that is referred to by the data request object. This step may be performed in one or more techniques, including one technique of generating or resetting a first time stamp associated with the local document on the mobile device when the local document is created. The first time stamp may be updated when the middleware system determines that the back-end system begins processing the data request object. In one embodiment, when the middleware initiates the processing of the data request object, the middleware system can either issue or receive from the back-end system a timestamp that corresponds to the back-end transaction terminating successfully. This timestamp is set in the back-end system and then synchronized to the mobile device and the local document on the mobile device, thereby overwriting the initial first time stamp value.

Additionally, the second time stamp is associated with the adjusted data object. This second time stamp is updated when the data object to be modified, or affected object, is adjusted on the back-end, such as the inventory amounts being changed, for example. In the sequence of operations, the back-end system processes the data request object, such that the first and second time stamps are adjusted accordingly.

Due to the intermittent communication between the mobile device and the middleware system, the middleware provides available time stamp values. In one embodiment, the second time stamp on the back-end system may be references by the second time stamp on the mobile device using a reference identifier. For example, a HASH key or other type of informative identifier may be used to correspond these values.

In one embodiment, the next step is determining if the first time stamp is later in time, e.g. having a greater value, than the second time stamp, step 208. If the first time stamp is later, this means that the data request object has been begun to be processed, either locally or on the back-end system and the affected data object has not yet been updated. Additionally, this also indicates that any local-stored data values on the mobile device reflect data values not including the back-end processing operations.

As such, the next step, step 210, is simulating the data field value based on the data request object. This step is typically performed in response to a user-based request for a particular function, such as generating a new document or checking an inventory level, for example. This simulation process includes replacing the stored original data value with the adjusted value in an output perspective, but maintaining internal records of the temporary, or not-yet-approved, nature of the adjusted value.

In this embodiment, the next step, step 212 is a determination if the mobile device is connected to the middleware system. If the answer is no, this means that the relationship between the first time stamp and the second time stamp does not change. Thereby, the procedure repeats back to step 210 until the determination of step 212 is in the affirmative.

Upon mobile connection to the middleware device, this embodiment of the method reverts back to step 206, whereupon the time stamps may be updated, if an update value is available. In this embodiment, if the adjusted object has been updated, the middleware device may include an updated second time stamp awaiting for transmission to the mobile device. This message is then received on the mobile device and the second time stamp value is accordingly updated.

At step 208, again the first time stamp is compared against the second time stamp. If the second time stamp is updated, this means that the second time stamp is later in time than the first time stamp, where the method proceeds to step 214. The mobile device thereupon uses the local data objects values instead of executing the simulation operations where the updated data object has been either provided or confirmed on the mobile device based on the completed operation on the back-end system. The simulation for the mobile device display is not performed because the local values now reflect the updated data object values as with the synchronization with the middleware system, existing mobile operations update the data values as instructed by the back-end processing system.

Thereby in this embodiment, the method is complete. Although, the technique for utilizing adjusted data on the intermittently connected mobile device is also applicable to multiple mobile devices and multiple documents. It is understood that the middleware functions with numerous mobile devices and thereby various local documents can have specific time stamps. The creation and ownership of the documents on the back-end system can maintain the relationship with the originating mobile device. And the asynchronous communication between mobile device and the middleware system can provide for allowing the continued operation of the mobile device when outside of communication with the middleware and managing prospective object value through simulation activities.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A method of operating a mobile device that is intermittently connected to a back-end processing system through execution of a middleware, the method comprising:
   receiving, by the mobile device, a user request to modify a data object stored on the back-end processing system;
   creating, by the mobile device, a data request object to update a data field on a local document stored on the mobile device from an original value to an updated value, wherein the data request object references the data object to be modified and does not change the data object to be modified;
   transmitting from the mobile device a data message including the data request object to the back-end system;
   recording on the mobile device a first time stamp indicating a start time of processing of the data request object on the back-end processing system;
   comparing, by the mobile device, the first time stamp with a second time stamp, wherein the second time stamp is recorded by the mobile device after the back-end processing system modifies the data object;
   if the first time stamp is an initial time stamp or later in time than the second time stamp, displaying on the mobile device a simulated data field for the local document, wherein the simulated data field represents the updated value of data field;
   resetting the first time stamp of the local document upon creation of the data request object;
   receiving an update time stamp for the first time stamp, wherein the update time stamp references the back-end processing system processing the data request object; and
   updating the first time stamp based on the update time stamp.

2. The method of claim 1 wherein when the data object to be modified is updated on the back-end processing system, the second time stamp is adjusted, the method further comprising:
   updating the second time stamp based on the second time stamp on the back-end processing system.

3. The method of claim 2 further comprising:
   receiving an updated time stamp for the second time stamp when the mobile device is in communication with the back-end processing system.

4. The method of claim 2 wherein the local document is referenced with the modified data object using a key.

5. The method of claim 2 wherein the second time stamp is adjusted when the modified data object is processed by the back-end processing system, the method comprising:
   updating the second time stamp based on the time stamp on the back-end processing system.

6. The method of claim 1 further comprising:
   if the second time stamp is later in time than the first time stamp, referencing the data field instead of the simulated data field.

7. The method of claim 1 wherein the mobile device communicates with the back-end processing system through intermittent communication with a middleware system.

8. A mobile system using adjusted data, wherein the mobile system is in intermittent communication with a back-end processing system, the mobile system comprising:
   an input device;
   a receiving device and a transmitting device operative for communication with the back-end processing system;
   a memory device having executable instructions stored therein; and a processing device, in response to the executable instructions, operative to:
    receive, via the input device, a user request to modify a data object stored on the back-end processing system;
    create, by the processing device, a data request object to update a data field on a local document stored in the memory from an original value to an updated value, wherein the data request object references the data object to be modified without directly changing the value;
    transmit a data message including the data request object to the back-end processing system through the transmitting device;
    recording on the memory a first time stamp indicating a start time of processing of the data request object on the back-end processing system;
  comparing, by the processing device, the first time stamp with a second time stamp, wherein the second time stamp is recorded by the processing device when the back-end processing system modifies the data object; and
    if the first time stamp is an initial time stamp or later in time than the second time stamp, displaying on the mobile device a simulated data field for the local document, wherein the simulated data field represents the updated value of data field,
  wherein the processing device, in response to executable instructions, is further operative to:
  reset the first time stamp of the local document upon creation of the data request object;
    receive an update time stamp for the first time stamp through the receiving device, wherein the update time stamp references the back-end processing system processing the data request object; and
    update the first time stamp based on the update time stamp.

9. The mobile system of claim 8 wherein when the data object to be modified is updated on the back-end processing system, the second time stamp is adjusted, the processing device, in response to executable instructions, is further operative to:
  update the second time stamp based on the second time stamp on the back-end processing system.

10. The mobile system of claim 9 wherein the processing device is further operative to:
  receive an updated time stamp for the second time stamp through the receiving device when the mobile device is in communication with the back-end processing system.

11. The mobile system of claim 9 wherein the local document is referenced with the modified data object using a key.

12. The mobile system of claim 9 wherein the second time stamp is adjusted when the modified data object is processed by the back-end processing system, the processing device further operative to:
  update second time stamp based on the time stamp on the back-end processing system.

13. The mobile system of claim 8, wherein the processing device, in response to executable instructions, is further operative to:
  if the second time stamp is later in time than the first time stamp, reference the data field instead of the simulated data field.

14. The mobile system of claim 8, wherein the mobile device communicates with the back-end processing system through a middleware system.

15. A method for using adjusted data on a mobile device being intermittently connected to a back-end processing device, the method comprising:
  receiving, by the mobile device, a user request to modify a data object stored on the back-end processing device;
  creating, by the mobile device, a data request object to update a data field on a local document stored on the mobile device from an original value to an updated value based on the user request to modify the data object, wherein the data request object references the data object to be modified without directly changing the value;
  resetting, by the mobile device, a first time stamp indicating a receipt time of the data request object by the back-end processing device;
  transmitting, from the mobile device, a data message including the data request object to the back-end device;
  updating, at the mobile device, the first time stamp relating to a beginning of processing the data request object on the back-end processing device;
  recording a second time stamp, wherein the second time stamp relates to a modified data object referenced by the data field on the local document as maintained on the back-end system;
  comparing, at the mobile device, the first time stamp with the second time stamp;
  if the first time stamp is an initial time stamp or is later in time than the second time stamp, displaying on the mobile device a simulated data field for the local document, wherein the simulated data field represents the updated value of data field,
  resetting the first time stamp of the local document upon creation of the data request Object;
  receiving an update time stamp for the first time stamp, wherein the update time stamp references the back-end processing system processing the data request object; and
  updating the first time stamp based on the update time stamp.

16. The method of claim 15 wherein the mobile device communicates with the back-end device through intermittent communication with a middleware system.

17. A computer-readable non-transitory medium including instructions adapted to execute a method of operating a mobile device that is intermittently connected to a back-end processing system through execution of a middleware, the method comprising:
  receiving, by the mobile device, a user request to modify a data object stored on the back-end processing device;
  creating, by the mobile device, a data request object to update a data field on a local document stored on the mobile device from an original value to an updated value based on the user request to modify the data object, wherein the data request object references the data object to be modified and does not change the data object to be modified;
  transmitting from the mobile device a data message including the data request object to the back-end system;
  recording on the mobile device a first time stamp indicating a start time of processing of the data request object on the back-end processing system;
  comparing, by the mobile device, the first time stamp with a second time stamp, wherein the second time stamp is recorded by the mobile device when the back-end processing system modifies the data object; and if the first time stamp is an initial time stamp or later in time than the second time stamp, displaying on the mobile device a simulated data field for the local document, wherein the simulated data field represents the updated value of data field, resetting the first time stamp of the local document upon creation of the data request object;

receiving an update time stamp for the first time stamp, wherein the update time stamp references the back-end processing system processing the data request object; and updating the first time stamp based on the update time stamp.

\* \* \* \* \*